United States Patent
Kline et al.

(10) Patent No.: US 10,170,036 B2
(45) Date of Patent: Jan. 1, 2019

(54) SYSTEMS AND METHODS FOR DISPLAYING IMAGES

(71) Applicant: International Business Machines Corporation, Armonk, NY (US)

(72) Inventors: Eric V. Kline, Rochester, MN (US); Frank R Libsch, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/693,248

(22) Filed: Apr. 22, 2015

(65) Prior Publication Data

US 2015/0262527 A1 Sep. 17, 2015

Related U.S. Application Data

(62) Division of application No. 13/789,100, filed on Mar. 7, 2013, now Pat. No. 9,129,561.

(51) Int. Cl.
| | |
|---|---|
| *G09G 3/3233* | (2016.01) |
| *H05B 37/02* | (2006.01) |
| *H04N 9/31* | (2006.01) |
| *G03B 21/56* | (2006.01) |

(Continued)

(52) U.S. Cl.
CPC ........... *G09G 3/3233* (2013.01); *G03B 21/56* (2013.01); *G03B 21/60* (2013.01); *H04N 9/3126* (2013.01);

(Continued)

(58) Field of Classification Search
CPC ........... G09G 3/3233; G09G 2360/141; G09G 2360/142; G09G 2360/145; H04N 9/3126;

(Continued)

(56) References Cited

U.S. PATENT DOCUMENTS

| | | | | |
|---|---|---|---|---|
| 4,160,160 A | * | 7/1979 | Hasegawa | ............. G03B 15/05 |
| | | | | 250/214 P |
| 5,952,789 A | | 9/1999 | Stewart et al. | |

(Continued)

FOREIGN PATENT DOCUMENTS

| | | |
|---|---|---|
| CN | 101311769 | 11/2008 |
| EP | 1571839 | 9/2005 |

OTHER PUBLICATIONS

Dheera Venkatraman, Simmons LED Display, Jun. 7, 2012, 5 Pages.

*Primary Examiner* — Tung X Le
*Assistant Examiner* — Henry Luong
(74) *Attorney, Agent, or Firm* — Lieberman & Brandsdorfer, LLC

(57) ABSTRACT

Systems and methods for displaying at least one image on an active display include a graphics generator for generating one or more graphics in form of at least one ghost image and a projector for projecting the generated at least one ghost image as an excitation light signal on the active display. The projector is a low power projector. Also included are number of detection diodes associated with pixels for detecting one or more excitation light signals for exciting each pixel associated with the detection diodes. Further included, is a photon detection circuit for generating at least one high power image photon based on the emitted light signal of each pixel on the active display and a number of light emitting diodes (LEDs) associated with each of the detection diodes for generating an emitted light signal for each of the pixels of the incident ghost image for generating an image on the active display.

18 Claims, 13 Drawing Sheets

(51) Int. Cl.
    *G03B 21/60*     (2014.01)
    *G03B 21/14*     (2006.01)

(52) U.S. Cl.
    CPC ....... *G03B 21/14* (2013.01); *G09G 2360/141* (2013.01)

(58) Field of Classification Search
    CPC ...... G03B 21/56; H05B 37/02; H05B 39/081; H05B 33/0869; H05B 33/0842
    USPC ................ 315/149–150, 158, 291, 307–308; 345/204, 207, 212, FOR. 136, FOR. 138
    See application file for complete search history.

(56) References Cited

U.S. PATENT DOCUMENTS

| | | | |
|---|---|---|---|
| 6,229,506 B1 | 5/2001 | Dawson et al. | |
| 7,167,169 B2 | 1/2007 | Libsch et al. | |
| 7,927,654 B2 | 4/2011 | Hagood et al. | |
| 8,081,177 B2 | 12/2011 | White et al. | |
| 2006/0164344 A1* | 7/2006 | Fish | G09G 3/3233 345/76 |
| 2007/0035490 A1* | 2/2007 | Johnson | G09G 3/02 345/81 |
| 2007/0040989 A1 | 2/2007 | Weng et al. | |
| 2007/0097321 A1 | 5/2007 | Whitehead et al. | |
| 2008/0002103 A1 | 1/2008 | Lee | |
| 2010/0289782 A1* | 11/2010 | Yamamoto | G09G 3/3233 345/207 |
| 2010/0309188 A1 | 12/2010 | Hying et al. | |
| 2011/0234647 A1 | 9/2011 | Kimoto et al. | |
| 2011/0248973 A1* | 10/2011 | Kuhlman | G09G 3/3208 345/207 |
| 2011/0279739 A1 | 11/2011 | Nairn et al. | |
| 2011/0304592 A1 | 12/2011 | Booth et al. | |
| 2012/0050339 A1 | 3/2012 | Huang et al. | |
| 2012/0270649 A1 | 10/2012 | Griswold et al. | |

* cited by examiner

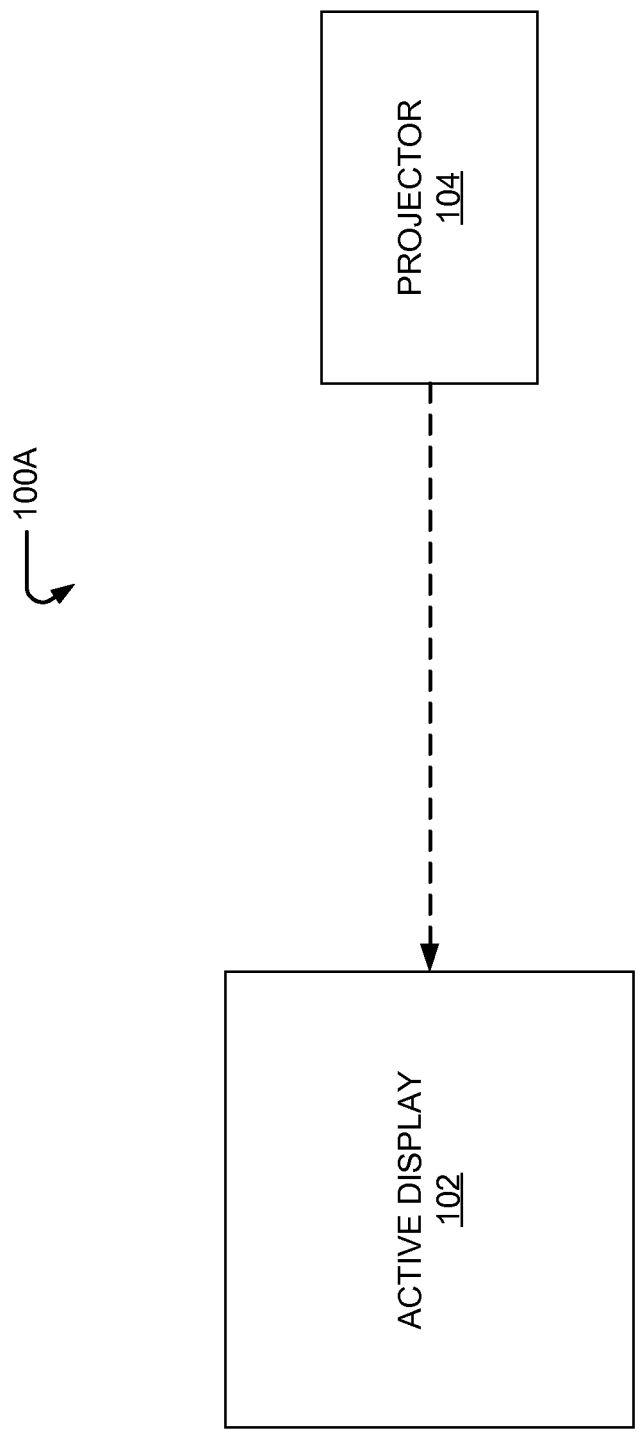

SYSTEMS AND METHODS FOR DISPLAYING IMAGES

CROSS-REFERENCE TO RELATED APPLICATION(S)

This application is a divisional of U.S. patent application Ser. No. 13/789,100, filed Mar. 7, 2013, titled "Systems and Methods for Displaying Images", now pending, which is hereby incorporated by reference.

FIELD OF THE INVENTION

The present disclosure relates to display systems and more specifically to systems and methods for displaying one or more images on an active display device.

BACKGROUND

A wide variety of display devices such as flat panel display devices are used in computer systems, portable systems, and entertainment devices such as, but not limited to, televisions. The flat panel devices are based on a number of technologies such as, plasma displays, liquid crystal displays (LCD), light-emitting diode (LED) devices, electroluminescent devices, and so forth. Such displays include multiple pixels arranged over a substrate to display image(s). The substrate can be a continuous sheet of plastic, glass, or other materials, and may be divided into multiple tiles. Each of the pixels can include several differently colored light emitting elements that may be referred as sub-pixels. Typically, the sub-pixels emit red, green and blue light to represent each image element.

Conventional methods and systems for displaying images require integrated pixel control in order for the display to operate. Control of pixels or sub-pixels is usually accomplished with orthogonal column electrodes and row electrodes, in an active-matrix or passive-matrix configuration as known in the art. These configurations can limit the timing flexibility of the display, add greater power supply requirements, add weight and cost and render the display less portable and limit the use environment. Further, in active-matrix displays, each sub-pixel includes one or more thin-film transistors (TFTs), and such transistors have undesirable non-uniformity or aging (e.g. amorphous silicon), which may cause image quality drift or variation.

In light of above discussion and limitations of existing techniques, there exists a need for systems and methods for displaying images on display devices with no pixel control.

BRIEF SUMMARY

Embodiments of the present disclosure provide a system for displaying at least one image on an active display. The system includes a graphics generator for generating one or more graphics in form of at least one ghost image. The system also includes a projector for projecting the generated at least one ghost image as an excitation light signal on the active display comprising a number of pixels. The projector can be a low power projector. The system also includes a detection diode associated with each of the pixels of the active display for detecting one or more excitation light signals for exciting each pixel associated with each detection diode. The system further includes a photon detection circuit for generating at least one high power image photon based on the detected one or more excitation light signals of the incident ghost image on the active display. The system also includes a light emitting diode (LED) associated with each detection diode for generating an emitted light signal for each of the plurality of pixels of the incident ghost image for generating an image on the active display.

Another embodiment of the present disclosure provides a system for displaying at least one image on an active display. The system includes a graphics generator for generating one or more graphics in form of at least one ghost image by using ambient 'graphic resource' intelligence. The system also includes a low power projector for projecting the generated at least one ghost image as an excitation light signal on the active display having a number of pixels by using its own graphics capabilities and at least one of a built in or peripheral low power LED projection capability. The system also includes a number of detection diodes associated with the pixels respectively for detecting one or more excitation light signals for exciting each pixel associated with the detection diodes. Further, the system includes a photon detection circuit for generating at least one high power image photon based on the detected one or more excitation light signals of the incident ghost image on the active display. The active display is based on at least one of an active or a passive display matrix. In addition, the active display matrix may include at least one of a single pixel and two or three pixels driven by one or more detection diodes. Furthermore, the system includes a number of light emitting diodes (LEDs) associated with each detection diode for generating an emitted light signal for each of the pixels of the incident ghost image for generating an image on the active display. Further, the low power projector can be configured to project a number of ghost images concurrently on different regions of the active display.

Another embodiment of the present disclosure provides a method for displaying at least one image on an active display. The method includes generating, by a graphics generator, one or more graphics in form of at least one ghost image. The method also includes projecting, by a low power projector, the generated at least one ghost image as an excitation light signal on the active display including multiple pixels. The method further includes detecting, by each of one or more detection diodes, one or more excitation light signals for exciting each pixel associated with the detection diodes. The detection diodes can be associated with the multiple pixels. The method further includes generating, by a photon detection circuit, at least one high power image photon based on the detected one or more excitation light signals of the incident ghost image on the active display. The method furthermore includes generating, by a plurality of light emitting diodes (LEDs) associated with each detection diode, an emitted light signal for each of the plurality of pixels of the incident ghost image for generating an image on the active display.

Yet another embodiment of the present disclosure also provides a method for displaying at least one image on an active display. The method includes generating, by a graphics generator, one or more graphics in form of at least one ghost image by using ambient 'graphic resource' intelligence. The method further includes projecting, by a low power projector, the generated at least one ghost image as an excitation light signal on the active display by using its own graphics capabilities and at least one of a built in or peripheral low power LED projection capability. The active display may have a number of pixels arranged in multiple rows and columns. The method further includes detecting, by a number of detection diodes, one or more excitation light signals for exciting each pixel associated with the detection diodes. Each of the detection diodes can be associated with a number of pixels respectively. Further, the method includes generating, by a photon detection circuit, at least one high power image photon based on the detected one or more excitation light signals of the incident ghost image on the active display. The active display can be based on at least one of an active or a passive display matrix. In addition, the active display matrix may include at least one of a single pixel and two or three pixels driven by one to three detection diodes. Furthermore, the method includes generating, by a number of light emitting diodes (LEDs), an emitted light signal for each of the pixels of the incident ghost image for generating an image on the active display. The low power projector can be configured to project a number of ghost images concurrently on different regions of the active display.

An additional embodiment of the present disclosure provides a display pixel circuit including a light detection device, an illumination persistence circuit having a storage device and an illumination gain circuit, and a light emitting device having an associated emitting device driver. The light emitting device is configured to charge the storage device during a first time period with a threshold voltage of the light emitting device driver by flowing a photocurrent through the light emitting device driver. The light emitting device may further be configured to switch a control voltage after a second time period to permit the light emitting device driver to drive the light emitting device based on a voltage level. The light detection device may be configured to illuminate after the first time period and before the second time period. The light detection device is illuminated by detecting at least one wavelength of light producing a current or photocurrent proportional to an illuminance of the light detection device. The illumination gain circuit may be configured to charge the storage device during the second time period to store the voltage level representing a sum of the threshold voltage of the light emitting device driver and a data voltage representing a level of illumination of the light detection device.

BRIEF DESCRIPTION OF THE SEVERAL VIEWS OF THE DRAWINGS

Figure 1B:
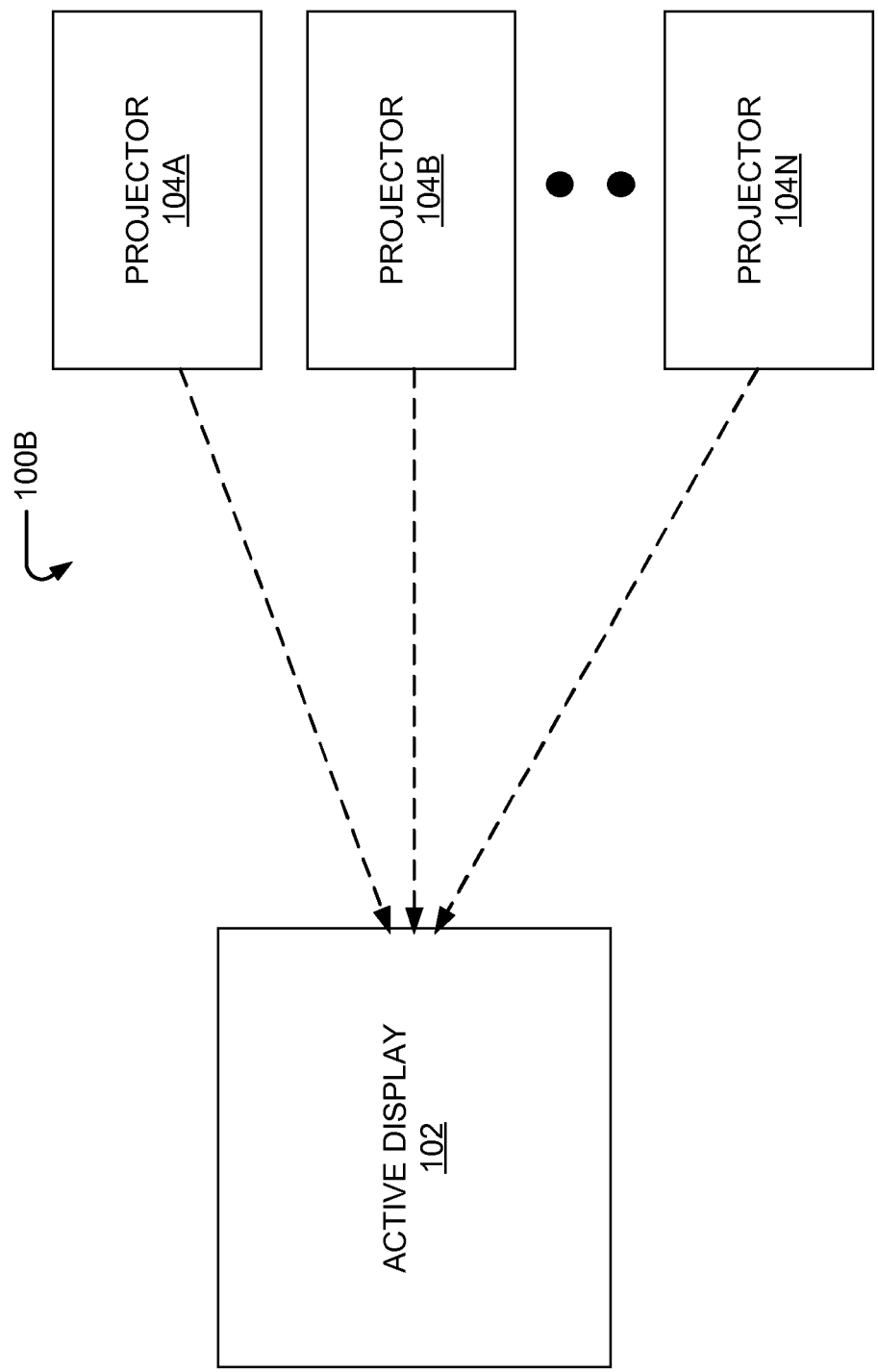
Figure 2:
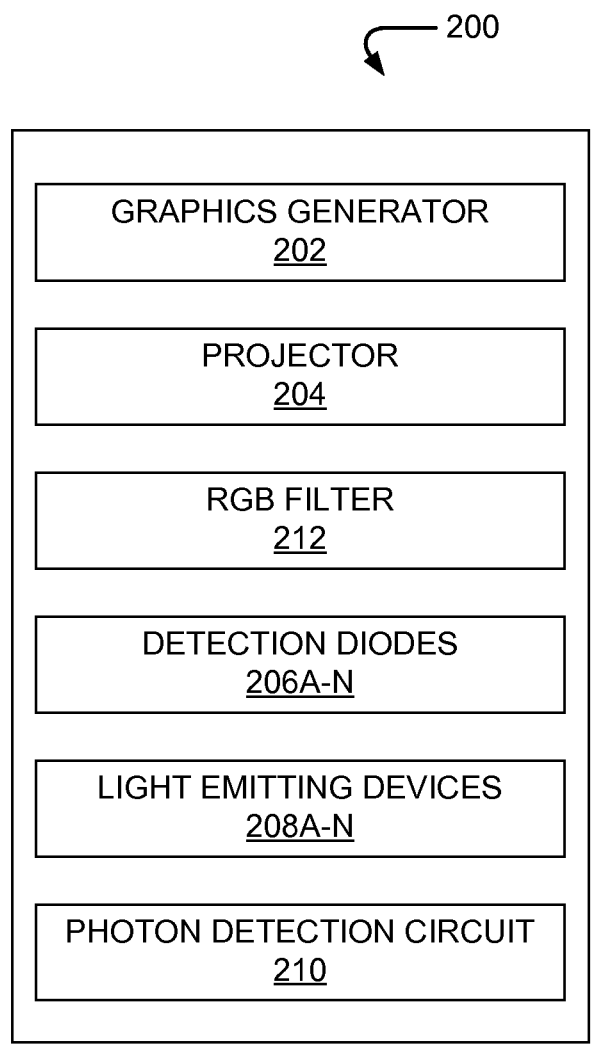
Figure 3A:
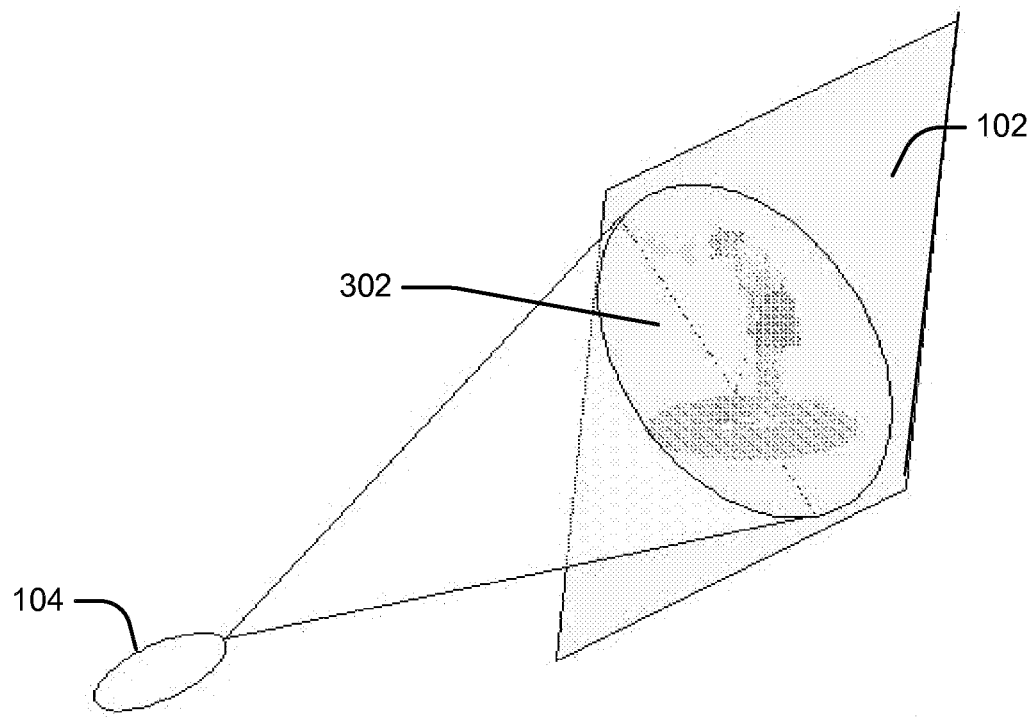
Figure 3B:
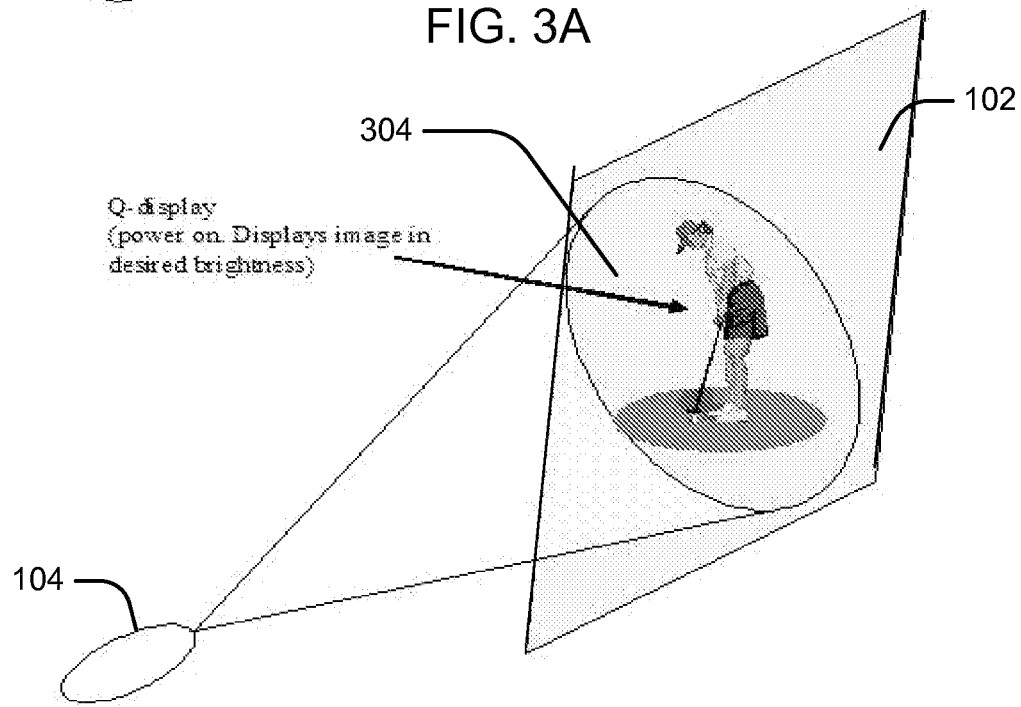
Figure 4:
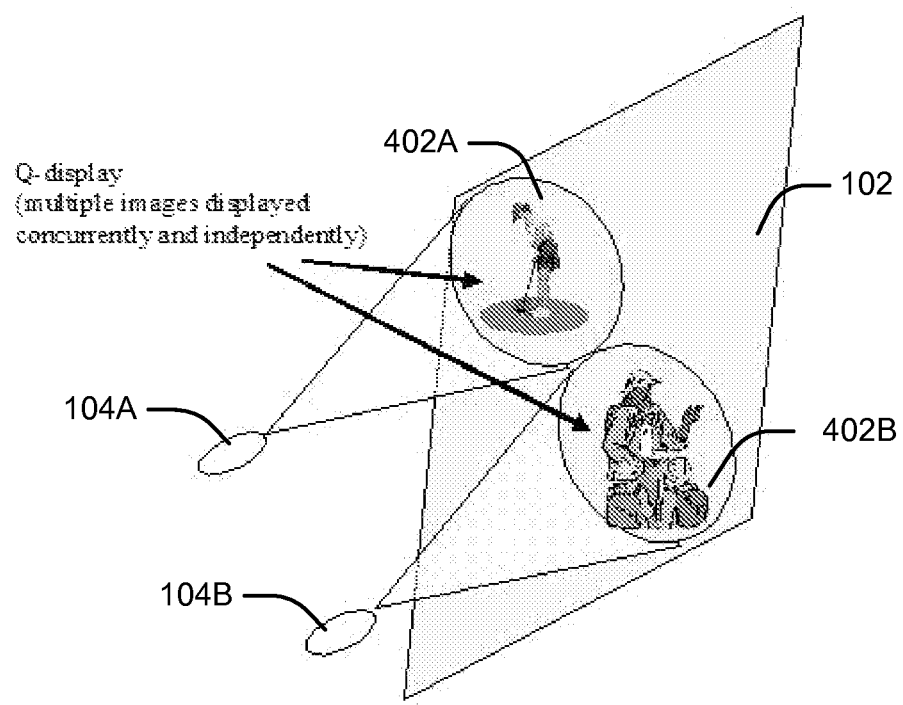
Figure 5:
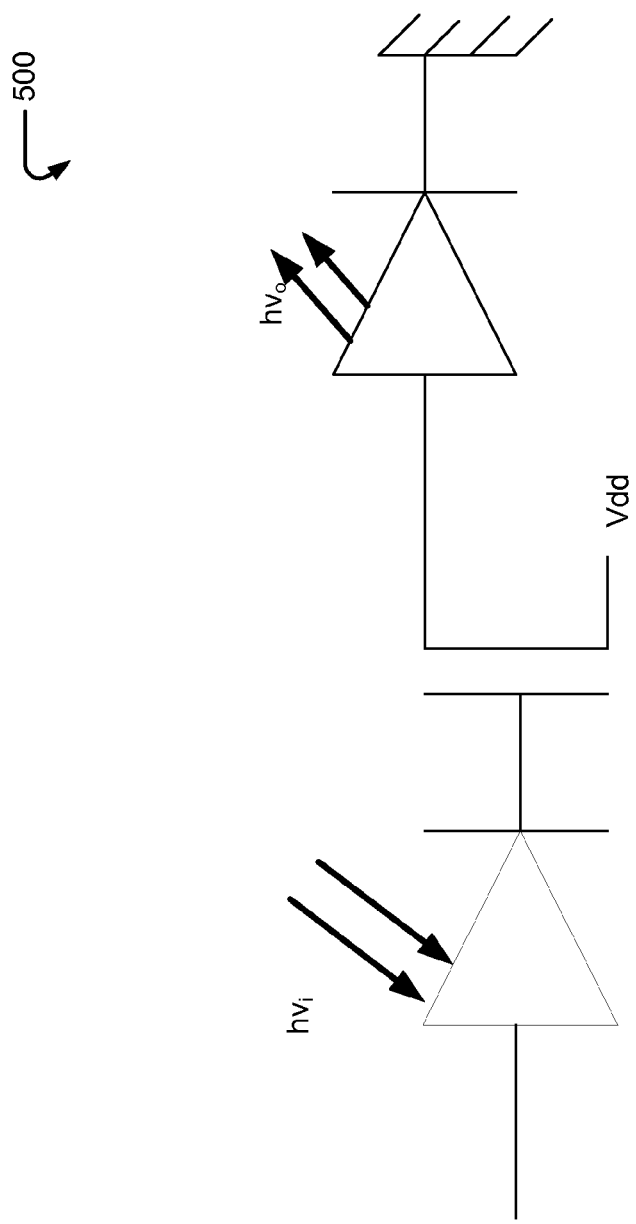
Figure 6A:
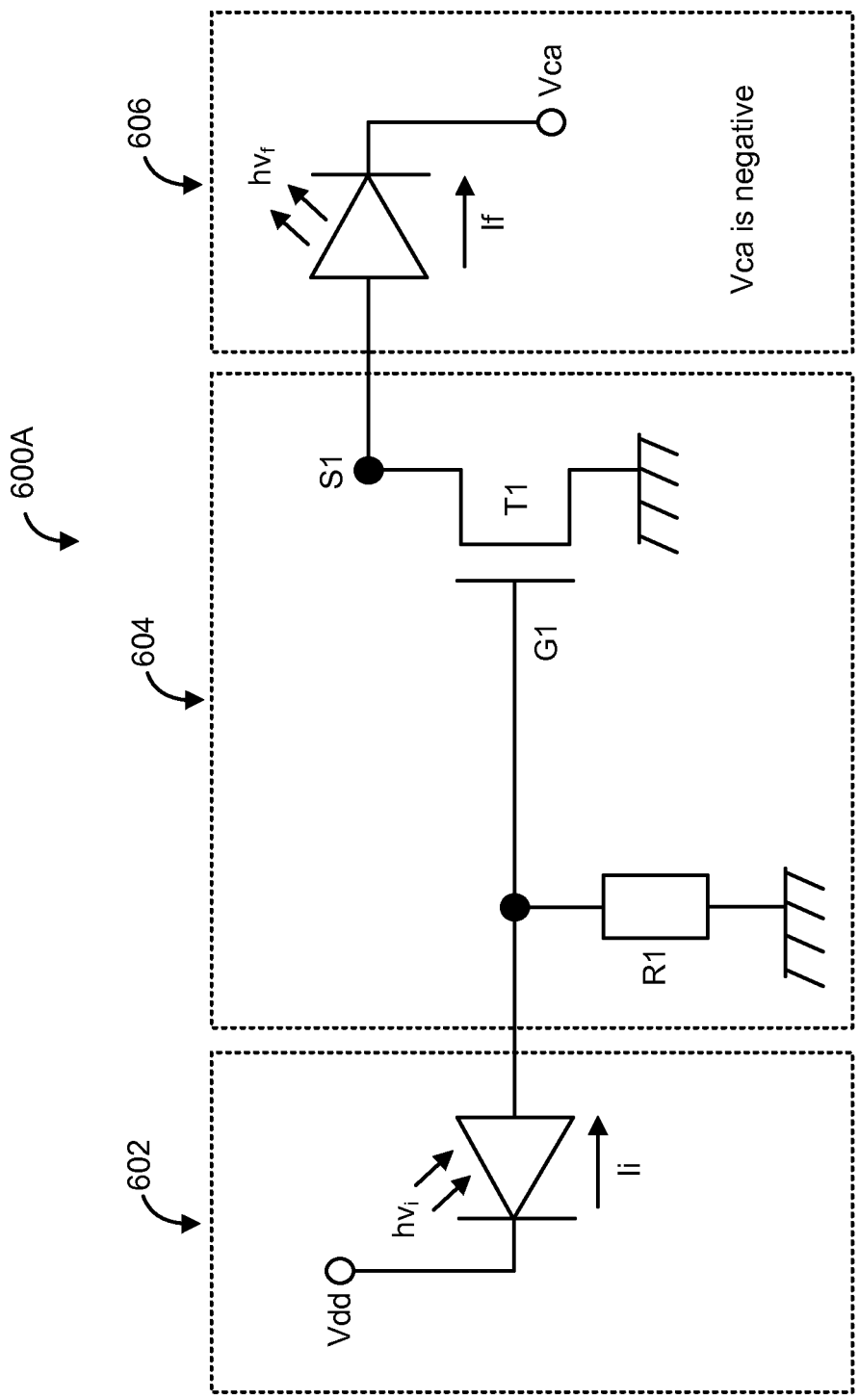
Figure 6B:
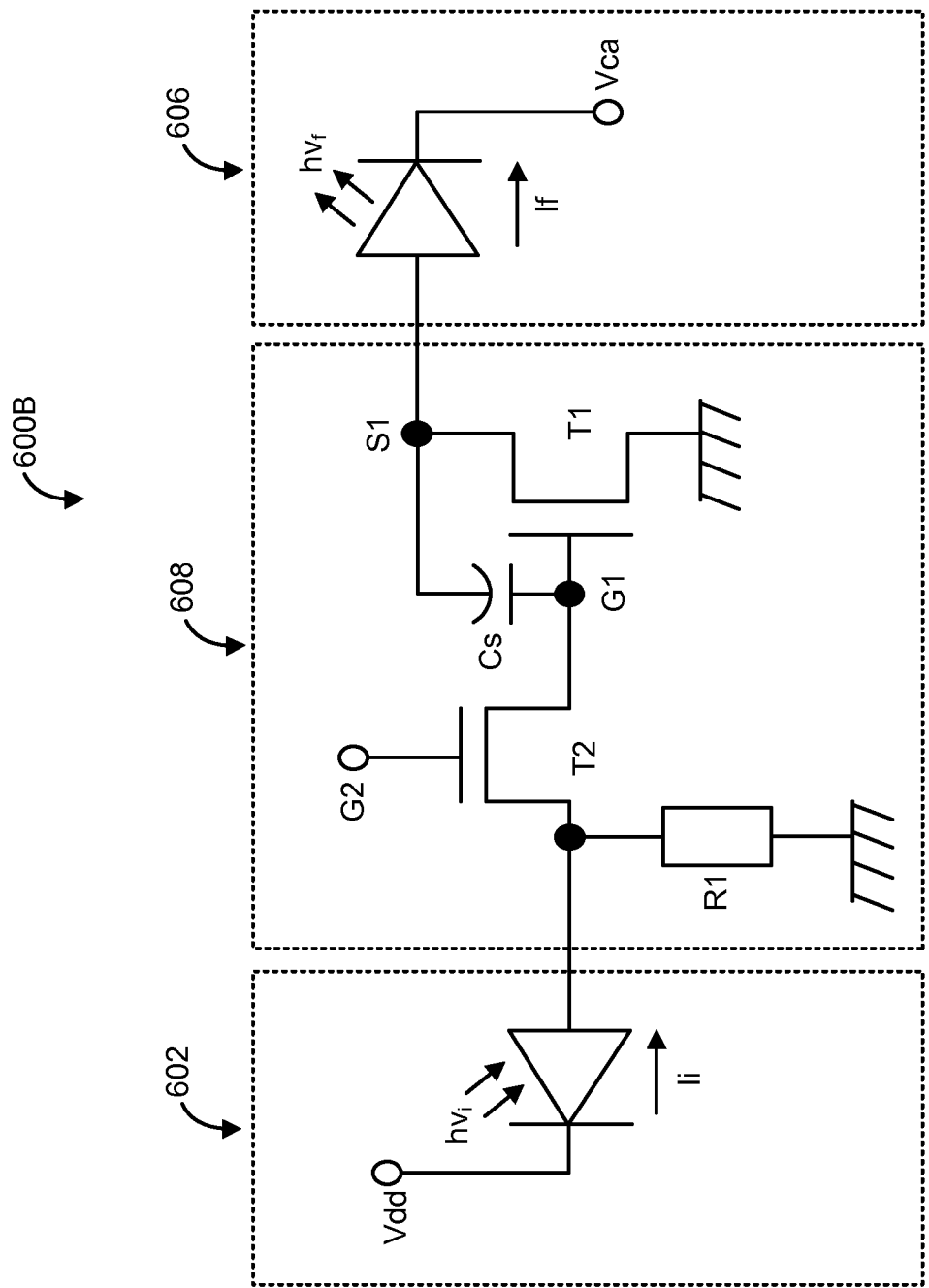
Figure 7A:
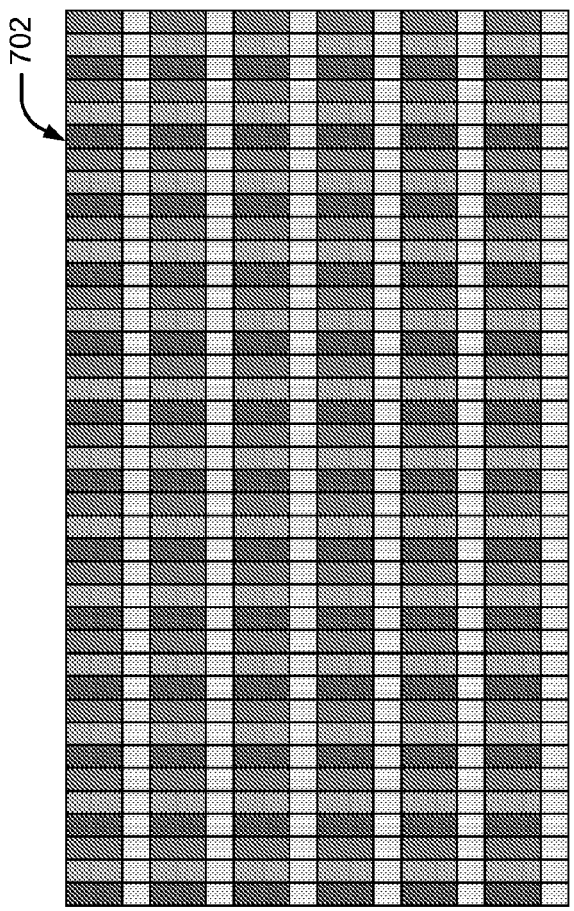
Figure 7B:
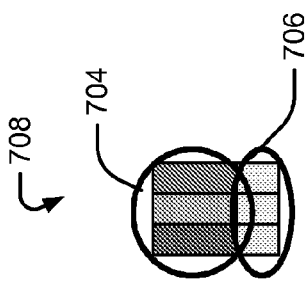
Figure 8A:
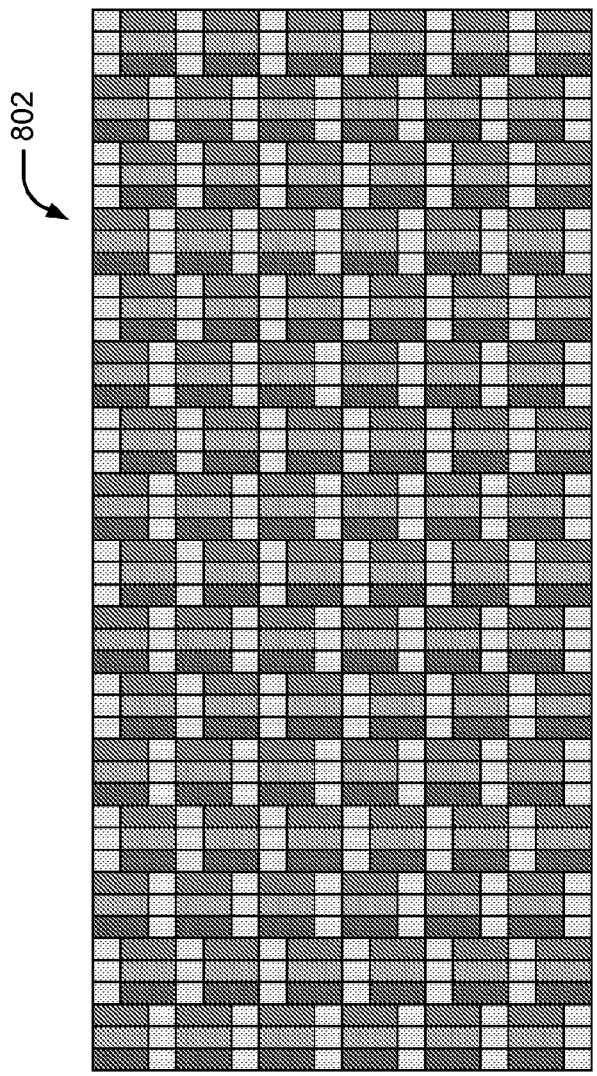
Figure 8B:
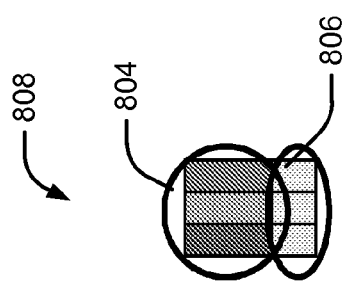
Figure 9A:
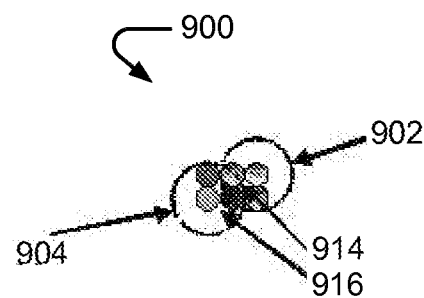
Figure 9B:
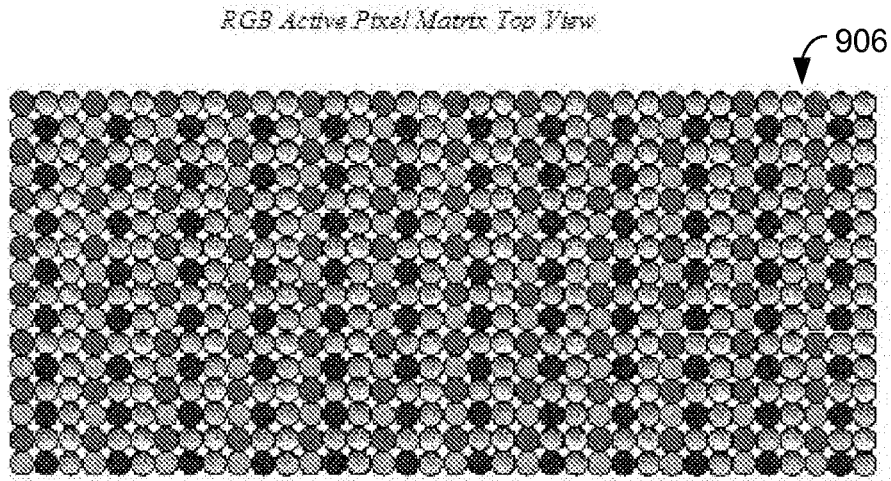
Figure 9C:
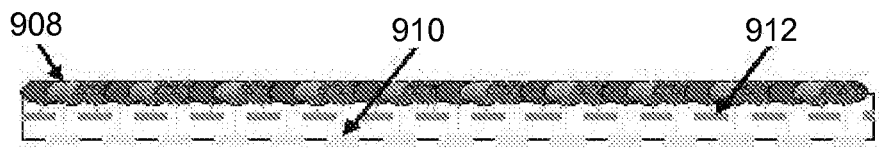
Figure 10:
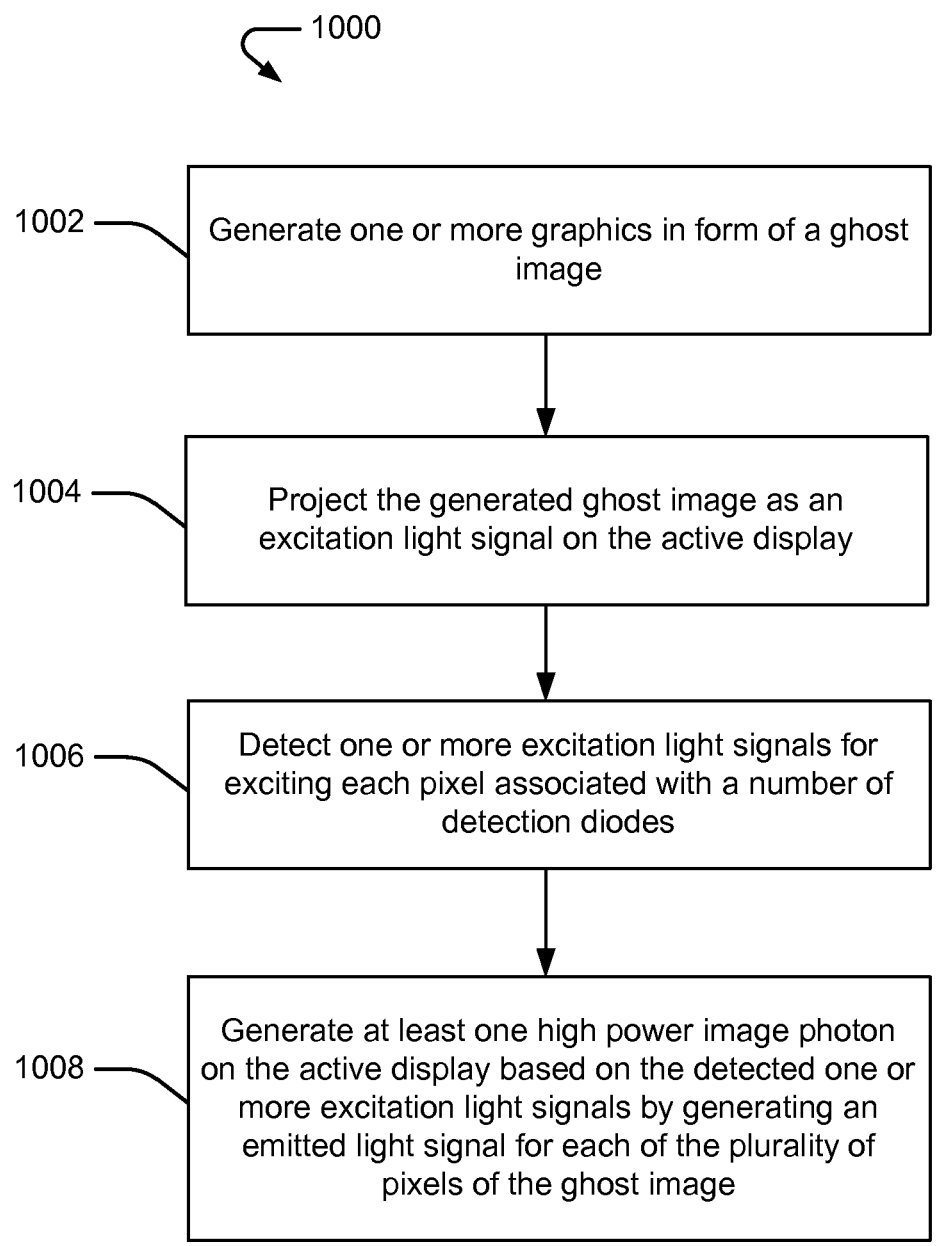
Figure 11:
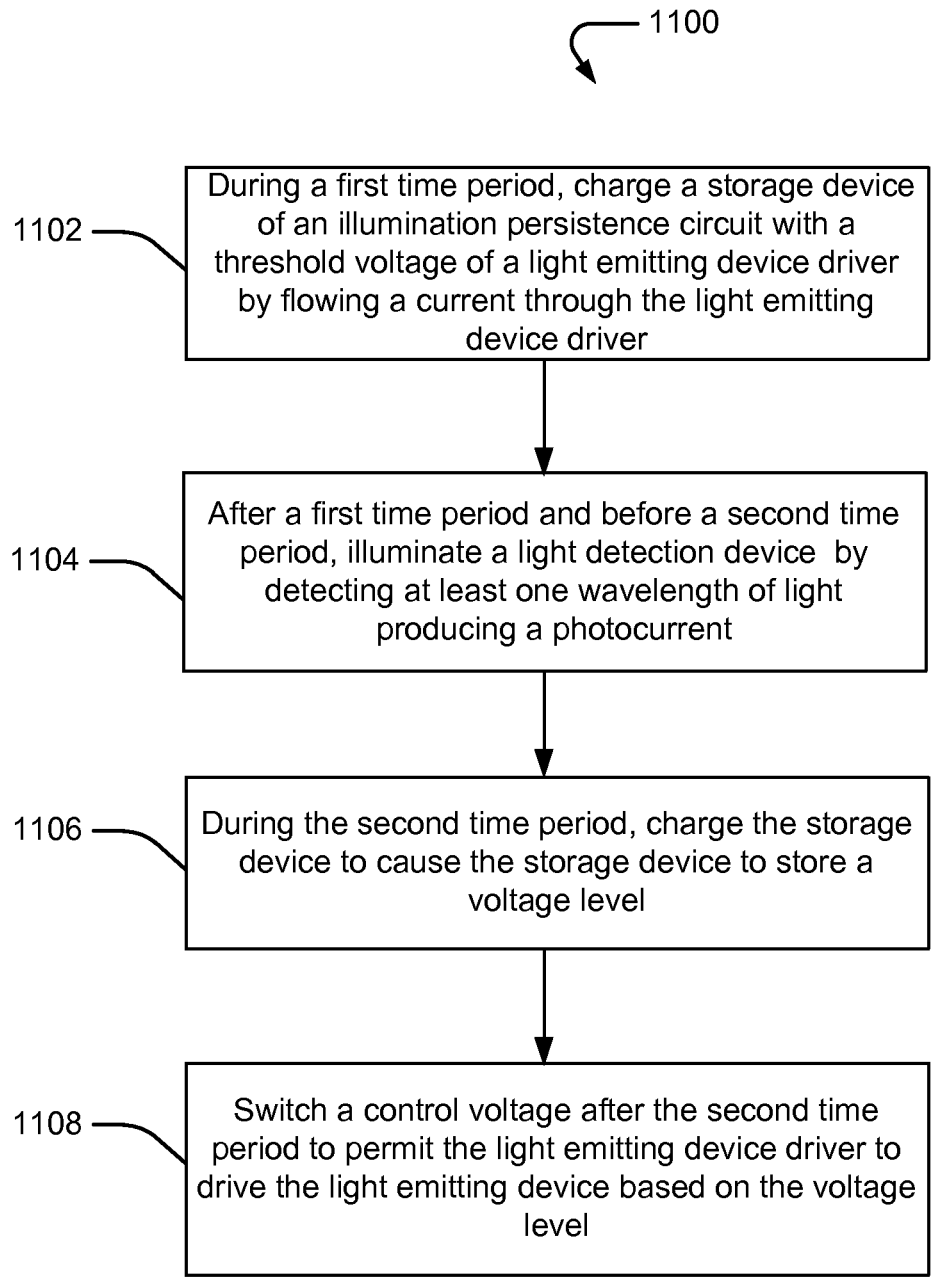

Having thus described the invention in general terms, reference will now be made to the accompanying drawings, which are not necessarily drawn to scale, and wherein:

FIG. 1A illustrates an exemplary system for displaying at least one image, in accordance with an embodiment of the present disclosure;

FIG. 1B illustrates another exemplary system for displaying at least one image, in accordance with another embodiment of the present disclosure;

FIG. 2 illustrates exemplary structural components/modules of disclosed system of displaying images on the active display;

FIG. 3A illustrates an exemplary projection of a ghost image, in accordance with an embodiment of the present disclosure;

FIG. 3B illustrates an exemplary display of image on the active display based on the projection of ghost image if FIG. 3A;

FIG. 4 illustrates projection and display of multiple images concurrently on an active display, in accordance with an embodiment of the present disclosure;

FIG. 5 illustrates a generic Quiescent-Pixel circuit (Q-Pixel circuit) of the active display, in accordance with an embodiment of the present disclosure;

FIG. 6A illustrates a Quiescent-Pixel circuit for continuous photon detection, in accordance with an embodiment of the present disclosure;

FIG. 6B illustrates a Quiescent-Pixel circuit for low power operation with data storage, in accordance with an embodiment of the present disclosure;

FIG. 7A-7B illustrates a top view of an exemplary RGB 'stripped' active matrix, in accordance with an embodiment of the present disclosure;

FIG. 8A-8B illustrates a top view of an exemplary RGB 'stripped staggered' active matrix, in accordance with an embodiment of the present disclosure;

FIGS. 9A-9C illustrates an exemplary RGB pixel active matrix of the active display 102;

FIG. 10 illustrates a flowchart diagram illustrating a method for displaying at least one image on the active display, in accordance with an embodiment of the present disclosure; and FIG. 11 is a flowchart diagram illustrating a method for driving a display pixel circuit, in accordance with another embodiment of the present disclosure.

DETAILED DESCRIPTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

The present disclosure provides a display device (or a system) and a method (technology), which is potentially low cost, low power, high quality and scalable in size and resolution. Further, the disclosed display system requires only power supply and may not require controlling circuits. The present disclosure may use existing display infrastructure (i.e., graphics control, etc.) present in existing devices such as, but not limited to, a laptop. Other potential applications, which might benefit from the disclosed system and method may include: 3-D display (i.e., camouflage of assets, cloaking device, dynamic/programmable appearance rendering, etc.). Presentations could be downloaded on to flash or to a mobile device such as a smart-phone, and can be played using the disclosed display device or system. Further, the disclosed system for displaying images is scalable. Therefore system may be very large and the low power projection may have a wide dispersion.

FIG. 1A illustrates an exemplary system 100A for displaying at least one image, in accordance with an embodiment of the present disclosure. As shown, the system 100A may include an active display 102 and a projector 104. The active display 102 may be based on an active display matrix of pixels. The active display matrix includes at least one of a single pixel and two or three pixels driven by one to three detection diodes (See FIG. 2). In some embodiments the active display 102 is based on a passive display matrix of pixels. Each of the pixels has at least one of a gate or transistor for turning each of the pixels on or off. In addition, each of the pixels may be coupled to power and/or ground. In an embodiment, the active display 102 is a Quiescent display (Q-Display). Further, the active display 102 may be at least one of a fixed display device, a flexible display device, or a 3-D flexible display device. In an embodiment, 3-D display may be rendered on the 3-D flexible display (or 3-D active display) using free-space ghost image modifier for 3-D conformation of display space. Each of the pixels may have associated a number of light emitting diodes (LEDs) for generating an emitted light signal for each of the pixels. In some embodiments, the active or passive display matrix of the active display 102 is scalable in terms of density and matrix size (i.e., fabrication as simple constant or variable density pixels in large panel or continuous sheet form). Further, the active display 102 is a display with no pixel control capability. Furthermore, the active display 102 is configured to display a low power incident image in high power. The pixel location on the display 102 is in a ratio of 1:1 with respect to incident image location. The active display 102 is configured to display multiple images concurrently as all pixels are independently excited or operated.

The projector 104 is configured to project the one or more ghost images as an excitation light signal on the active display 102. In some embodiments, the projector 104 is a low power projector that may be a conventional device or a part of a conventional device such as, but not limited to, a computer, a laptop, a Smartphone, a camera, and so forth. Hereinafter, the projector 104 may be referred as a low power projector 104 without changing its meaning. In some embodiments, the projector 104 can be within the active display 102. In other embodiments, the projector 104 is not a part of the active display 102 (as shown) and is a separate device. The low power projector 104 can project the one or more low power ghost image(s) using its own graphics capabilities. In some embodiments, the low power projector 104 can project the ghost image(s) based on a built in or peripheral low power LED projection capability. The projector 104 is also configured to project a number of displays or ghost images concurrently on different regions of the active display 102. The one or more modules or components of the system 100A are described in detail in FIG. 2.

FIG. 1B illustrates another exemplary system 100B for displaying at least one image, in accordance with another embodiment of the present disclosure. As shown, there may be one or more projectors 104A-N that can project one or more ghost images on the active display 102.

FIG. 2 illustrates exemplary structural components/modules of disclosed system 200 of displaying images on the active display 102. The system 200 may include a graphics generator 202, a projector 204, a number of detection diodes 206A-N, a number of light emitting diodes (LEDs) 208A-N, a photon detection circuit 210, and a red green blue (RGB) filter 212. The one or more modules or components of the system 200 may be part of the active display 102. For example, the active display 102 can include the multiple detection diodes 206A-N, a number of LEDs 208A-N, at least one photo detector 210, and RGB filter 212. Furthermore, each of the pixels of the active display 102 has an associated detection diode 206 and an associated LED 208. Hereinafter, detection diode 206 collectively refers to detection diodes 206A-N and may be used interchangeably. Similarly, LED 208 collectively refers to LEDs 208A-N and may be used interchangeably. In some embodiments, the graphics generator 202 may be a part of the projector 204 (or the projector 104). In another embodiment, the graphics generator 202 may be a separate device and may not be a part of the active display 102.

As discussed with reference to FIGS. 1A-1B, the active display 102 can be configured to display one or more images. The active display 102 can include a number of pixels arranged in a pattern including multiple rows and columns. The active display 102 can be based on at least one of an active or a passive display matrix. Further, the active display matrix includes at least one of a single pixel and two or three pixels driven by the one or two of the detection diodes 206A-N. Each of the pixels has at least one of a gate or transistor for turning each of the pixels on or off. In some embodiments, each of the pixels is coupled to power and ground. The active display 102 can be at least one of a fixed display, a flexible display, or a 3-D flexible display. The 3-D display can be rendered on the 3-D flexible display using at least one free-space ghost image modifier for 3-D conformation of display space.

The graphics generator 202 can be configured to generate one or more graphics in form of at least one ghost image. In some embodiments, the generator 202 may generate the ghost image(s) by using ambient 'graphic resource' intelligence. The projector 204 (or projector 104) can be configured to project the generated at least one ghost image as an excitation light signal on the active display 102. The projector 204 can be a low power projector. In an embodiment, the projector 204 may be a separate device which is not a part of the active display 102. Further, the projector 204 can project the at least one low power ghost image or ghost images using its own graphics capabilities. For example, the ghost image(s) can be projected from a laptop-projector. Further, the graphics or the ghost image may be projected as a single wavelength or RGB (or wavelength translated RGB equivalent), which can be detected by the active display 102 via the multiple detection diodes 206A-N embedded with each pixel. Then, the low projection incident light from ghost-image can excite pixel into operation via detections diodes 206A-N & gate(s) associated with multiple pixels.

In some embodiments, the projector 204 may project the ghost image(s) using at least one of a built in or peripheral low power LED projection capability. Further, the projector 204 may be configured to project a number of displays or ghost images concurrently on different regions of the active display 102. Though not shown, but in an embodiment, the system 200 may include multiple projectors similar to projector 204, that may project different ghost image onto the active display 102 concurrently or simultaneously.

The multiple detection diodes 206A-N can be associated with multiple pixels of the active display 102. Further, each of the detection diodes 206A-N may be configured to detect one or more excitation light signals for exciting a pixel associated with the detection diodes 206A-N. Each of the detection diodes 206A-N may be turned on or off for at least each incident Red Green Blue (RGB) or an input signal. Each of the detection diodes 206A-N can operate in zero bias or reverse bias states.

The at least one photon detection circuit 210 can be configured to generate at least one high power image photon based on the detected one or more excitation light signals of the incident ghost image on the active display 102. The system 200 may use any suitable photo detection circuit or detector, such as, but not limited to, PN photodiode (or a PN junction), PIN photodiode, and PAD photon detection circuit. The PIN photodiode may be a diode with a wide, lightly doped 'near' intrinsic semiconductor region between an n-type semiconductor and a p-type semiconductor region. Here, doping a semiconductor means adding impurities in the semiconductor to modulate its one or more electrical properties. Typically, the p-type and n-type semiconductor regions are heavily doped because they are used for ohmic contacts.

Each of the light emitting diodes (LEDs) 208A-N may be associated with a detection diode or the multiple detection diodes. In an embodiment, the LEDs 208A-N may be associated with a pixel of the active display 102. Further, each of the LEDs 208A-N can be configured to generate an emitted light signal for each of the pixels of the incident ghost image for generating an image on the active display 102. Furthermore, the LEDs 208A-N can adjust the emitted image brightness via common supply adjustment. In some embodiment, the LEDs 208A-N can adjust emitted brightness via separate and adjustable R, G, and B power biases. The LEDs 208A-N may also adjust color by designed-in offsets and/or separate and adjustable RGB power biases.

The RGB filter 212 can be configured to filter the one or more excitation light signals to provide excitation of specific pixels of the active display 102 in the desired wavelength. By using the above described modules 202-212, the system 200 can generate a high power image photon for viewing from a low power image photon incident upon the photon detection circuit 210 of the active display 102.

The disclosed active display 102 is based on a two diode pixel topology i.e., one diode is PN or PIN incident photon detection circuit (or photon detection circuit 210), and the other is the LED emitting diode 208. In some embodiment, the display may include phototransistor, photo-multipliers, and other types.

FIG. 3A illustrates an exemplary projection 302 of a ghost image, in accordance with an embodiment of the present disclosure. As discussed with reference to FIGS. 1A-1B, the projector 104 may project at least one ghost image or graphics on the active display 102. The active display 102 includes a number of pixels arranged in a pattern of rows and columns. Based on the projection from the projector 104 (or 204) one or more pixels of the active display may be illuminated as shown on the active display 102. In an embodiment, the active display 102 is a Q-display. As shown, the power of one or more pixel is off to demonstrate ghost image projection 302. The projector 104 may project a low power ghost image from a low power projection device such as, a laptop, a Smartphone, a camera, a computer, an I-pod, an I-pad, and so forth. The projector 104 may have native graphics capability and peripheral or embedded projection means.

FIG. 3B illustrates an exemplary display of image on the active display 102. As shown, power may be switched to display an image 304 in desired brightness. In an embodiment, the power of one or more pixels based on the ghost image projection may be switched on. This means the brightness of the active display could be adjusted by adjusting the power intensity of the ghost image. In addition, the brightness could also be adjusted by adjustment of the power levels of the active display 102 (i.e. by increasing or lowering all pixels simultaneously). Further, each of the RGB pixel elements' optical 'gain' of the active display can be off-set one from another by design and/or by programming.

FIG. 4 illustrates projection and display of multiple images concurrently on the active display 102, in accordance with an embodiment of the present disclosure. As discussed with reference to FIGS. 1A-1B, there may be multiple projectors 104 which can project low power ghost images on the active display 102. Though FIG. 4 shows only two projectors 104A-104B, but there can be any number of projectors that can project ghost images concurrently on the active display 102. In an embodiment, the number of projectors 104 which can project ghost image on the active display 102 depends on the size of the active display 102 or Q-display. As shown, the projector 104A projects and/or displays an image 402A and the projector 104B projects and/or displays the image 402B on the active display 102. The active display 102 (or Q-display) is configured to display multiple images concurrently and independently.

FIG. 5 illustrates a generic Q-Pixel circuit 500 of the active display 102, in accordance with an embodiment of the present disclosure. As discussed with reference to FIGS. 1A-1B and FIG. 2, the projector 104 may project a ghost image or graphics in form of incident light i.e. '$hv_i$' on the active display 102. Further, the active display 102 includes a number of pixels. Each of the pixels may be defined by a RGB net. FIG. 5 shows a single color net. In this Q-Pixel circuit 500 neither a gate nor an interconnect is required. The incident light i.e. '$hv_i$' of the ghost image may be of any wavelength that may be specified to excite a specific RGB output (display) light i.e. '$hv_o$' wavelength and intensity coupled to and proportional to '$hv_i$'. As shown in this embodiment, the emitted light i.e. '$hv_o$' travels along a vector, which is approximately 180 from the incident excitation signal i.e. '$hv_i$'. This means, that the detecting and emitting diodes face the same direction. In another embodiment, the detection diodes and the LEDs may face substantially in opposite directions. Directionality of incident excitation signal '$hv_i$' may be assumed in some embodiments but unidirectional and/or multidirectional modes may also be used or implemented for the disclosed pixel circuit 500.

FIG. 6A illustrates a Quiescent-Pixel circuit (or a display pixel circuit) 600A for continuous photon detection, in accordance with an embodiment of the present disclosure. Hereinafter, the quiescent-pixel circuit 600A and the display pixel circuit 600A may be used interchangeably. As shown, the display pixel circuit 600A may include a light detection device 602 (or a photon detection device), and a light emitting device 606. Though not shown, but the display pixel circuit 600A may include more than one light detection device 602, and light emitting device 606. The light detection device 602 may be at least one of a P-N junction photodiode, a PIN photodiode, a photodetector, a photoconductor, a photosensor, a photoresistor, a phototransistor, or a charge coupled device. The light emitting device 606 may be at least one of an organic light emitting diode, an inorganic light emitting device, a field emission device, or a phosflouresence device. The light emitting device 606 may further have an associated light emitting device driver (not shown). The light emitting device driver may further include a transistor (shown as T1 and T2). As shown, the illumination gain circuit 604 and the illumination persistence circuit 608 may further include one or more gates (shown as G1 and G2) for turning each of the pixels on or off.

The display pixel circuit 600A may further include an illumination gain circuit 604 between a light emitting device 606 and the light detection device 602. The illumination gain circuit 604 may be based on at least one of a light emitting device photoconductor gain, a voltage follower gain stage, a resistive load gain stage, or a current controlled voltage gain stage.

In an embodiment, the illumination gain 604 may be part of an illumination persistence circuit 608 as shown in FIG.

6B. FIG. 6B illustrates a Quiescent-Pixel circuit 600B for low power operation. As depicted in FIG. 6B, the illumination persistence circuit 608 may further include the storage device. In an embodiment, the storage device may be a data storage capacitance i.e. Cs. The storage device may isolate the light detection device 602 from the light emitting device 606 without interruption to a light emitting illumination level.

With continuing reference to FIG. 6A and FIG. 6B, the light detection device 602 may be configured to charge the storage device during a first time period with a threshold voltage of the light emitting device driver by flowing a current through the light emitting device driver. Further, the light detection device 602 may be configured to switch a control voltage after a second time period to permit the light emitting device driver to drive the light emitting device 606 based on a voltage level. The voltage level may represent a sum of the threshold voltage of the light emitting device driver and a data voltage representing a level of illumination of the light detection device 602.

The light detection device 602 may be configured to illuminate after the first time period and before the second time period. The light detection device 602 may be illuminated by detecting at least one wavelength of light producing a photo current that is linearly proportional to illuminance. In an embodiment, the photocurrent may be linearly proportional to irradiance. In an embodiment, the light detection diode 602 may be a photodiode operating in a photoconductive mode by applying a reverse bias (with a cathode positive) to the photodiode with the intent of having no current flow through the circuit in the absence of projector light. In the absence of no on current, there is no output voltage across the load resistor, R1. When a photon strikes the photodiode 602, it may create an electron-hole pair in the conductivity band in the carrier depletion zone of the photodiode's PN junction. The quantum efficiency of this process may reach nearly 100%, meaning that there is one pair produced per incident photon. The charges then may flow through the load resistor R1 upon the action of the bias voltage, thus producing an output voltage. For a given spectral distribution, the photocurrent is linearly proportional to the illuminance (and to the irradiance). Also, wide spectral response from 190 nm to 1100 nm (silicon), and longer wavelengths may be possible with other semiconductor materials.

Further, for attaining high signal-to-noise ratio, the active area of the photodiode 602 may be kept as small as possible so that junction capacitance i.e. '$C_j$' is small and junction resistance i.e. '$R_j$' is high. In an embodiment, for large display area optical "gain" i.e. through lens, mirror, etc. may be used rather than a large area diode. The optical "gain" is essentially noise-free where electrical amplification is not noise-free.

If some embodiments, when high sensitivity is needed for detecting extremely low light intensities, avalanche photodiodes, intensified charge-coupled devices or photomultiplier tubes may be used as light detection device 602. The display pixel circuit 600A may result in relatively low noise and in turn high quantum efficiency which may be greater than 80%.

Further, photoresistors may rely on bulk material effects in a uniform film of semiconductor that are readily available in larger area display technology, such as a-Si, polysilicon, and typically may have no p-n junctions that produce a resulting non-polar device(s). The resistance in larger display devices may drop in reverse proportion to the intensity of incoming light, from virtually infinity to a residual floor that may be as low as less than hundred Ohms.

The illumination gain 604 may be configured to charge the storage device during the second time period to store the voltage level. In an embodiment, the storage device or the data storage capacitance may store the voltage level. Further, as shown in FIG. 6A, the illumination gain 604 may further include a switch configured to isolate the light detection device 602 from the light emitting device 606.

FIG. 7A-7B illustrates a top view of an exemplary RGB 'stripped' active matrix 702, in accordance with an embodiment of the present disclosure. As shown, the stripped active matrix 702 may include multiple pixels of Red, Green, Blue (RGB) arranged in an array. FIG. 7B is a top view of an RGB 'stripe' active matrix pixel 708 showing sub pixels. The RGB 'stripe' active matrix pixel unit 708 can be a triplex of detection diodes 704 and an RGB triplex of emitting diodes 706 joined to form a detecting-emitting RGB 'stripe' active matrix pixel unit 708. As shown, the RGB 'stripe' active matrix pixel 708 may include one or more RGB emitter diodes 704 and RGB detector or sensor diodes 706. The RGB 'stripped' active matrix 702 may be appropriate for representing data and drawings. Further, the RGB 'stripped' active matrix 702 may have advantages in low cost matrix patterning.

As discussed with reference to FIGS. 6A-6B, the light emitting device 602 or LEDs can be used as the emitters 704 as well as sensors or detectors 706. An LED as a photodiode (or the light detection diode 602) can be sensitive to wavelengths equal to or shorter than a predominant wavelength it emits. Additionally in some embodiments, the LED can be multiplexed so that it can be used for both light emission and detecting at different times. However, it can either transmit or receive information at one time, not both (half-duplex).

FIG. 8A-8B illustrates a top view of an exemplary RGB 'stripped staggered' active matrix 802, in accordance with an embodiment of the present disclosure. As shown, the 'stripped staggered' active matrix 802 may include multiple pixels of Red, Green, Blue (RGB) arranged in an array. FIG. 8B is a top view of an RGB 'stripe' active matrix pixel 808 showing sub pixels. An RGB 'stripe' active matrix pixel unit 808 can be a triplex of detection diodes 804 and an RGB triplex of emitting diodes 806 joined to form a detecting-emitting RGB 'stripe' active matrix pixel unit 808. As shown, the RGB 'stripe' active matrix pixel 808 may include the one or more RGB emitter diodes 804 and one or more RGB detector or sensor diodes 806. Further, the RGB 'stripped staggered' active matrix 802 may be appropriate for displaying natural images.

FIGS. 9A-9C illustrates an exemplary RGB pixel active matrix of the active display 102. FIG. 9A is a top view of an RGB pixel unit 900 showing sub pixels. An RGB triplex of detection diodes 902 and an RGB triplex of emitting diodes 904 can be jointed into a detecting-emitting RGB pixel unit 900. The G i.e. green detector 914 is electrically connected to the G emitting LED 916 as shown in FIG. 9A, likewise the other detector-emitter (or detection diode and emitting diode) parings may happen in the RGB pixel unit 900. Each detector-emitter pair can be independently connected to power and ground, which may be structured as a plane for easy interconnection by means of vertical interconnect accesses (VIAs). The VIA may provide the through hole paths to the other surface on the circuit. The VIAs may refer to a vertical electrical connection between different layers of conductors in a physical electronic circuit. In some embodiments, the planes may be separated by dielectric. In at least one embodiment, the planes may be fabricated on a rigid substrate using any suitable diode fabrication method. Examples of the diode fabrication methods may include, but are not limited to, a-Si, e-Ink, organic semi-conductors, III-V, crystalline Si, and so forth.

In some embodiments, the disclosed system 200 may be fabricated on a flexible plastic film substrate using one (or more) of the above mentioned diode fabrication methods. The quiescent power consumption of the system 200 may depend on types of diodes i.e. the detection diodes 206A-N and the LEDs 208A-N can be employed in the specific design of the system 200. For example, a ~10K×10K matrix of RGB pixels would be ~2B diodes=>~200 mA quiescent current draw (assuming a dark current of 100 pA per diode) operating in reverse bias mode. For scaling purposes, most HD pixel densities range from ~50 to ~350 PPI (pixels per inch). At 350 PPI, 10K pixels translates to a viewable dimension of ~28" i.e. 28 inches, thus a 200 mA dark power budget supports a ~784 sq. in active display (=>~2.6 mA/sq. in). For most viewing applications this dark power budget could be reduced by ½ or even ⅔ without loss of image resolution to unaided human eye.

Thus, detection diodes 206A-N in a variety of types may be suitable for the implementing the active display 102 or the system 200, and dark power budget can be reasonable even for very high pixel densities. The disclosed system 200 and the active display 102 are therefore quite technically feasible.

Further, with respect to operational performance, the pixel unit 900 of FIG. 9A can yield a significant linear emitted intensity response proportional to incident (ghost image) photon density. This means the brightness of the active display could be adjusted by adjusting the power intensity of the ghost image. In addition, the brightness could also be adjusted by adjustment of the power levels of the active display 102 (i.e. by increasing or lowering all pixels simultaneously). Further, each of the RGB pixel elements' optical 'gain' of the active display can be off-set one from another by design and/or by programming.

FIG. 9B illustrates an x-section of the RGB active pixel matrix. FIG. 9C illustrates a cross-section view of an array of RGB detection diodes and light emitting diodes 908 fabricated on a flexible organic sheet material. As shown, each pixel of the RGB pixel unit 900 or the active display 102 may be grounded i.e. a ground plane 910. Each of the pixels of the RGB pixel unit 900 or the active display 102 may be connected to power as shown by a power plane 912. Though FIG. 9C do not show all power and grounded VIAs (i.e. 910 and 912), but a person skilled in the art will appreciate that the active display may include more power and grounded VIAs (i.e. 910 and 912).

FIG. 10 illustrates a flowchart diagram illustrating a method 1000 for displaying at least one image on the active display 102. As discussed with reference to FIGS. 1A-1B and FIG. 2, the projector 104 may project one or more images on the active display 102. In an embodiment, multiple instances of the projector 104 (or 204) may project multiple images on the active display 102. Further, the active display 102 is a display device with only power connections and no pixel or graphics control.

At step 1002, one or more graphics in form of at least one ghost image may be generated. In an embodiment, the graphics generator 204 may generate the one or more graphics or ghost images. The graphics generator 204 may be a separate device which is not a part of the active display 102. In an embodiment, the graphics generator 204 may be a part of the projector 104 (or 204). At step 1004, the generated at least one ghost image may be projected on the active display 102. In an embodiment, the projector 104 or 204 may project the ghost image(s) on the active display 102. Further, the projector 104 or 204 may be a low power projector which is not a part of the active display 102. At step 1006, one or more excitation light signals for exciting each pixel associated with the detection diodes 206A-N may be detected. In an embodiment, the detection diodes 206A-N may detect the one or more excitation signals.

Thereafter, at step 1008, the photon detection circuit 210 may generate at least one high power image photon based on the detected one or more excitation light signals of the incident ghost image on the active display 102. Further, the active display 102 may be based on at least one of an active or a passive display matrix. Further, the active display matrix can include at least one of a single pixel and two or three pixels driven by one or more detection diodes. Furthermore, for generating the high power image photon, each of the multiple LEDs 208A-N associated with each detection diode may generate an emitted light signal for each of the pixels of the incident ghost image. Accordingly, a high power image may be displayed on the active display.

FIG. 11 is a flowchart illustrating a method 1100 for driving a display pixel circuit (600A or 600B), in accordance with an embodiment of the present disclosure. As discussed with reference to FIGS. 6A-6B, the display pixel circuit 600A may include the one or more light detection device 602, the illumination gain circuit 604, the light emitting device 606. As shown in FIG. 6B, the display pixel circuit 600B may include the light detection device 602, a illumination persistence circuit 608 including the illumination gain circuit 604 and a storage device (e.g. data storage capacitance 'Cs'), and the light emitting device 606. The light emitting device 606 may include a light emitting device driver.

At step 1102, during a first time period, charging the storage device (e.g. 'Cs') with a threshold voltage of the light emitting device driver by flowing a current through the light emitting device driver. Then at step 1104, after the first time period and before a second time period, illuminating the light detection device 602 by detecting at least one wavelength of light producing a photocurrent. The photocurrent may be linearly proportional to illuminance of the light detection device 602 and irradiance in some embodiments. At step 1106, during the second time period, charging the storage device to cause the storage device (i.e. 'Cs') to store a voltage level. The voltage level may represent a sum of the threshold voltage of the light emitting device driver and a data voltage representing a level of illumination of the light detection device 602. Thereafter, at step 1108, after the second time period to permit the light emitting device driver to drive the light emitting device 606 based on the voltage level.

The active or the passive display matrix of the active display 102 can be scalable in terms of density, matrix size. Further, the active display can be a fixed or a flexible display. In some embodiments, a 3-D display can be rendered on a 3-D flexible display (i.e. the active display 102) using free-space ghost-image modified for 3-D conformation of display space. The disclosed system for displaying images on the active display can be configured for afferent or efferent i.e. for front or back side ghost image incidence or excitation. Further, the active display can be a ubiquitous, pervasive low cost fixed or flexible display device that may reside anywhere. Further, the disclosed system of display can be used to display images which is user owned on-demand or public demand anywhere with convenience. Any device with a capability to project a ghost image can use the disclosed system 200 for displaying images. Examples of the device may include iPod, Smartphone, laptop, tablet computer, and so forth. Further, the resolution of the displayed images is decoupled from interconnect limitations.

Embodiments of the present disclosure are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general-purpose computers, special purpose computers, or other programmable data processing translator to produce machines, such that the instructions, which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A display pixel circuit comprising:
  a light emitting device operatively coupled to a light emitting device driver, the light emitting device driver configured to:
    charge a storage device with a threshold voltage of the light emitting device driver by flowing a current through the light emitting device driver; and
    switch a control voltage to permit the light emitting device driver to drive the light emitting device based on a voltage level;
  a light detection device illuminated by detecting at least one wavelength of light producing a photocurrent proportional to an illuminance of the light detection device, wherein the light detection device is reverse biased and includes a cathode connected to a power voltage, and wherein the cathode is driven positive with respect to an anode connected to a load resistor; and
  an illumination persistence circuit, consisting of the storage device, and comprising an illumination gain, wherein the illumination gain is configured to charge the storage device to store the voltage level;
  wherein the storage device is connected in series with the light detection device and the light emitting device.

2. The display pixel circuit of claim 1, wherein the illumination gain is present between the light emitting device and the light detection device.

3. The display pixel circuit of claim 2, wherein the storage device isolates the light detection device from the light emitting device without interruption to a light emitting illumination level.

4. The display pixel circuit of claim 3, wherein the storage device is a data storage capacitance.

5. The display pixel circuit of claim 4, wherein the data storage capacitance stores the voltage level.

6. The display pixel circuit of claim 2, wherein the illumination gain further comprises a switch configured to isolate the light detection device from the light emitting device.

7. The display pixel circuit of claim 1, wherein the light detection device is at least one of a P-N junction photodiode, a PIN photodiode, a photodetector, a photoconductor, a photosensor, a phototransistor, or a charge coupled device.

8. The display pixel circuit of claim 1, wherein the light emitting device is at least one of an organic light emitting diode, an inorganic light emitting device, or a field emission device.

9. The display pixel circuit of claim 1, wherein the illumination gain is based on at least one of a light emitting device photoconductor gain, a voltage follower gain stage, a resistive load gain stage, or a current controlled voltage gain stage.

10. The display pixel circuit of claim 1, wherein the illumination persistence circuit includes a load resistor to receive a charge from the light detection device.

11. The display pixel circuit of claim 10, wherein the light emitting device driver includes a transistor.

12. The display pixel circuit of claim 11, wherein the display pixel circuit at least partially defines a pixel, and wherein the illumination persistent circuit includes one or more gates to turn the pixel on or off.

13. The display pixel circuit of claim 12, wherein at least one of the gates is positioned between the load resistor and the storage device.

14. The display pixel circuit of claim 1, wherein control of the light emitting device is internal to the display pixel circuit.

15. A method for driving a pixel circuit, comprising:
configuring a storage device, consisting of a single capacitor, in series with a light detection device and a light emitting device;
charging the storage device with a threshold voltage of a light emitting device driver by flowing a current through the light emitting device driver;
illuminating the light detection device, wherein the light detection device detects at least one wavelength of light producing a photocurrent proportional to an illuminance of the light detection device, and wherein the light detection device is reverse biased and includes a cathode connected to a power voltage, and wherein the cathode is driven positive with respect to an anode connected to a load resistor;
charging the storage device of an illumination gain to cause the storage device to store a voltage level; and
switching a control voltage to permit the light emitting device driver to drive the light emitting device based on the voltage level stored in the storage device.

16. The method of claim 15, further comprising isolating the light detection device from the light emitting device without interruption to a light emitting illumination level.

17. A display pixel circuit comprising:
a light emitting device operatively coupled to a light emitting device driver, the light emitting device driver configured to:
charge a storage device with a threshold voltage of the light emitting device driver by flowing a current through the light emitting device driver; and
switch a control voltage to permit the light emitting device driver to drive the light emitting device based on a voltage level;
a light detection device is illuminated by detecting at least one wavelength of light producing a photocurrent proportional to an illuminance of the light detection device wherein the light detection device is reverse biased and includes a cathode connected to a power voltage, and wherein the cathode is driven positive with respect to an anode connected to a load resistor; and
an illumination persistence circuit comprising the storage device, an illumination gain, and a load resistor operatively coupled to a transistor, wherein the illumination gain is configured to charge the storage device to store the voltage level;
wherein the storage device is connected in series with the light detection device and the light emitting device.

18. The display pixel circuit of claim 17, further comprising one terminal of the load resistor connected to a drain of the transistor.

* * * * *